3,299,618
PROCESS FOR SEPARATING ACRYLONITRILE
AND ACETONITRILE
Heinrich Kunze, Cologne-Stammheim, Arnold Hausweiler, Cologne-Flittard, and Bernhard Scherhag and Rudolf Haupt, Leverkusen, Germany, assignors to Farbenfabriken Bayer Aktiengesellschaft, Leverkusen, Germany, a German corporation
Filed Dec. 18, 1963, Ser. No. 331,582
Claims priority, application Germany, Dec. 19, 1962, F 38,598; July 4, 1963, F 40,152
8 Claims. (Cl. 55—85)

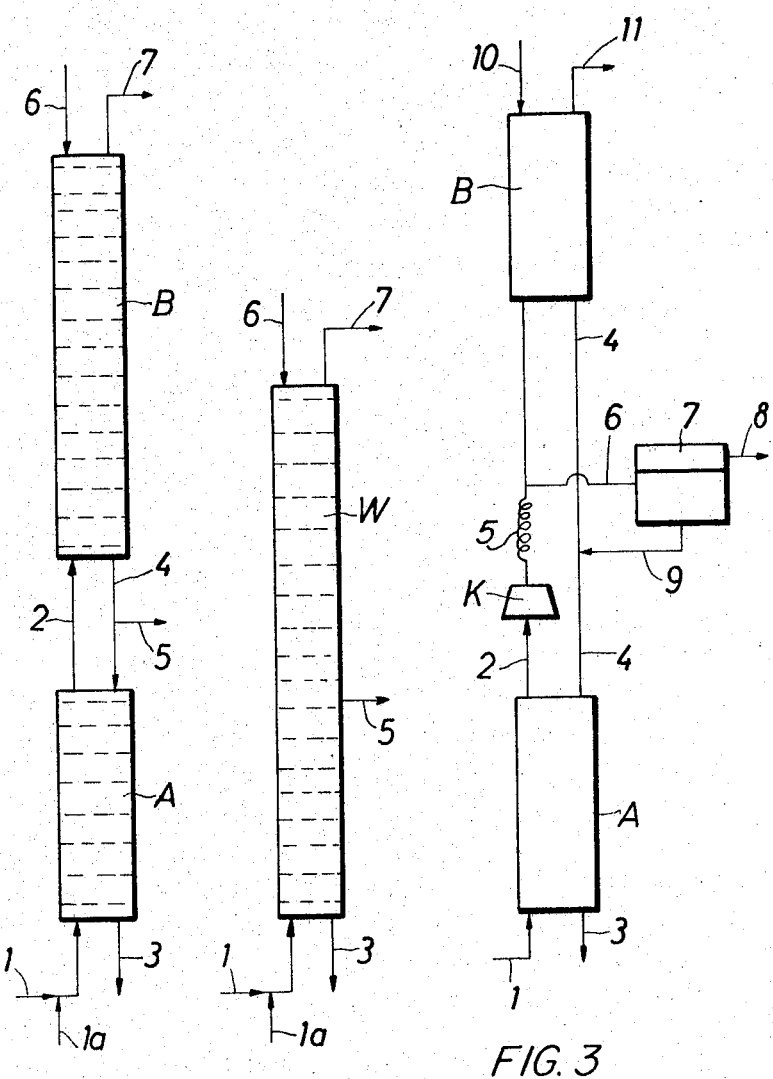

This invention relates to a process for separating acrylonitrile and acetonitrile from mixtures containing both components.

In the processes for the production of acrylonitrile by catalytic oxidation of propylene or acrolein in the presence of ammonia, acetonitrile and hydrocyanic acid are always formed as by-products.

The separation of acrylonitrile and acetonitrile presents considerable difficulties. Distillation necessitates high expense for separation stages and energy, especially as the acrylonitrile must not contain more than very small quantities of acetonitrile if it is to be suitable for processing to polymers.

According to a process described in Belgian patent specification No. 616,116, the separation of acrylonitrile and acetonitrile can be effected at normal pressure by selectively washing with water the reaction gases containing the nitriles resulting from a synthesis of acrylonitrile. In this process, all the acetonitrile and some of the acrylonitrile and hydrocyanic acid are washed out by water from the reaction gas in a washing column at normal pressure. Acrylonitrile free from acetonitrile and hydrocyanic acid are recovered from the waste gas in accordance with known processes by another scrubbing with water; the dissolved nitriles are driven off from the used washing water in a separate separating column in order to separate acrylonitrile and acetonitrile. The acrylonitrile and the hydrocyanic acid must be separated from the acetonitrile in order to avoid losses.

In these processes, both the acrylonitrile scrubber and the acetonitrile scrubber are operated using independent streams of water, either fresh water or water from the process purified by distillation. The distillation expenditure for driving off the water is therefore approximately proportional to the sum of both quantities of water.

It has now been found in accordance with the present invention that a very economical separation of acrylonitrile and acetonitrile from gas mixtures containing both these components is provided by a process, in which acetonitrile is first substantially washed out by scrubbing with water and then acrylonitrile is substantially washed out from the resulting gas mixtures, and in which some of the wash water resulting from the washing out of the acrylonitrile is used as washing water to wash out the acetonitrile.

The process according to the invention will be explained by reference to FIGURE 1. The gas mixture containing acrylonitrile and acetonitrile is introduced into the washing tower A through the pipes 1 and 1a. Washing water is introduced into this washing tower through the pipe 4 in order that as much as possible of the acetonitrile is washed out from the gas mixture, but as little as possible of the acrylonitrile is to be absorbed by the washing water. The wash water containing the acetonitrile and small quantities of acrylonitrile is extracted from the washing tower through the pipe 3 for a conventional working up operation. The gases freed from acetonitrile leave the washing tower A through the pipe 2 and are introduced into the washing tower B. Water is supplied to the top of this washing tower, through the pipe 6, and the acrylonitrile contained in the gases is substantially washed out by this water. The wash water, which contains acrylonitrile, is withdrawn from the base of the column through the pipe 4. Some of this wash water is supplied to the top of the washing column A, and some is drawn off through the pipe 5 and worked up to give acrylonitrile. The residual gases leave the washing tower B through the pipe 7. The gas mixtures which are formed when working up of the reaction products and which contain acrylonitrile and acetonitrile can be supplied through the pipe 1A for further working up.

In another constructional form, the two washing columns A and B can be combined into one column. Such an arrangement is shown in FIG. 2. Gas mixtures containing acrylonitrile and acetonitrile are introduced into the washing tower W through the pipes 1 and 1a. Water is supplied to the top of this washing tower through the pipe 6. In this working procedure the lower part of the column W corresponds to the washing column A and the upper part of the column W corresponds to the washing column B. Accordingly, acetonitrile is almost completely washed out in the lower part of the washing column W, and the acrylonitrile is substantially washed out in the upper part of the column W. In the part of the column W which corresponds to the base of the column B in FIG. 1, a mixture of water and acrylonitrile is drawn off through the pipe 5 and worked up to give acrylonitrile. Acetonitrile is washed out in the lower part of the column W by an aqueous solution which contains acrylonitrile. The wash water containing acetonitrile is drawn off from the bottom of the column W and worked up to give acetonitrile. The residual gases leave the column through the pipe 7.

In the process according to the invention the acetonitrile and acrylonitrile can be washed out or scrubbed either at normal pressure or at superatmospheric pressure. It is also possible for the two scrubbings to be carried out under different pressures which are expediently so matched to one another, utilising the dependence of the gas solubility upon pressure, that the wash water which leaves the acrylonitrile absorber (washing tower B) through the pipe 4 forms two phases. The aqueous phase which forms can then be used as washing water for the acetonitrile absorber (washing tower A), while the organic, substantially anhydrous, phase which is chiefly acrylonitrile can be distilled directly. The separator necessary for working up the water phase then becomes superfluous and there is a considerable saving in expense, especially if the gas must be compressed for the recovery of low-boiling constituents.

Another way in which the two absorption stages can mutually be adapted depends upon the temperature coefficients of gas solubility; the two absorbers are operated under different temperatures or the pressure and temperature stages are combined with one another it also being possible for the raising of the pressure to be replaced by a corresponding lowering of the temperature.

In one preferred embodiment of the process according to the invention, the gas mixture leaving the washing tower after the acetonitrile has been washed out is liquefied, the resulting water and liquid acrylonitrile are drawn off and worked up, and the remaining gas mixture is supplied to a second washing column for washing out the residual acrylonitrile. In one preferred procedure, the liquid constituents drawn off are conducted into a settling vessel, the organic phase from which is worked up to give acrylonitrile.

The partial liquefaction of the gas mixture which leaves the washing tower after washing out the acetonitrile is expediently effected by compression of the gas mixture and subsequent cooling. Depending upon the pressure used, which can for example be 2 to 20 atmospheres, more or less of the acrylonitrile is liquefied. The compressed mixture is expediently cooled. In this way, it is for example possible for 20 to 90% of the acrylonitrile contained in the gas mixture to be liquefied.

The organic phase consisting largely of acrylonitrile can be separated from the aqueous phase in a separating vessel. The acrylonitrile phase is worked up in the usual way and the aqueous phase is expediently added to the washing water for the washing out of the acetonitrile. In one preferred embodiment, the washing water which is used to wash out the acetonitrile is the water obtained when washing out the residual acrylonitrile from the gas.

The process according to the invention is further explained by reference to FIG. 3. The gas mixture containing the acrylonitrile and acetonitrile is introduced through the pipe 1 into the washing tower A. Washing water is supplied through the pipe 4 in order that the acetonitrile is as far as possible selectively washed out of the gas mixture. The wash water containing acetonitrile and some acrylonitrile runs from the washing tower through the pipe 3, to a conventional working-up stage, from which the acrylonitrile is returned in vapour form into the pipe 1.

The gases substantially freed from acetonitrile leave the washing tower A through the pipe 2 and are supplied to the compression stage K, after which they are cooled in the condenser 5 forming liquids which are supplied through the pipe 6 to a settling vessel 7. The upper organic phase is drawn off through the pipe 8 and supplied to the acrylonitrile pure distillation stage. The lower aqueous phase is supplied through the pipe 9 to the washing water for the acetonitrile washing tower A.

The gases leaving the condenser 5 are introduced into the washing tower B so that the gaseous acrylonitrile which is still contained in these gases may be washed out. Water is supplied to the top of this washing tower through the pipe 10, drawn off through the pipe 4 at the base of the column and, after mixing with the aqueous phase 9, is used as washing water for the acetonitrile column A. The gases freed from the organic components escape at the top of the washing tower B through the pipe 11.

The process according to the invention can also be used to purify gas mixtures which contain other water-soluble compounds apart from acetonitrile and acrylonitrile, as for example hydrogen cyanide, provided these other compounds do not decisively change the solubility ratio between acetonitrile and acrylonitrile.

The acrylonitrile which is contained in the washing water for washing out the acetonitrile does not significantly influence the selectivity of the acetonitrile washing or scrubbing and thus enables the process according to the invention to be carried into effect.

*Example 1*

A steam-saturated gas stream containing 1000 parts by weight of inert gas (molecular weight 30), 45 parts by weight of acrylonitrile and 6 parts by weight of acetonitrile is conducted at atmospheric pressure and room temperature through an absorption column containing 20 bubble plates. 800 parts by weight of water at a temperature of 25° C. and containing 6.5 parts by weight of acrylonitrile are supplied to the top of the column. 800 parts by weight of water, 6 parts by weight of acetonitrile and 10.5 parts by weight of acrylonitrile are run off at the base of the column, while the gas leaving the top of the column consists of 1000 parts by weight of inert gas, 41 parts by weight of acrylonitrile and traces of acetonitrile. This gas is conducted at atmospheric pressure into the next column consisting of 45 bubble plates, over which trickle 5050 parts of fresh water at a temperature of 25° C. Whereas the gas discharging at the top of this column consists of 1000 parts by weight of inert gas and small traces of acrylonitrile, a single-phase mixture containing 5050 parts by weight of water and approximately 41 parts by weight of acrylonitrile is discharged at the base. From this mixture, 800 parts by weight of water, containing 6.5 parts by weight of acrylonitrile, are returned to the top of the first column, while the remainder passes on and worked up for acrylonitrile.

Both columns can be combined into one column comprising 65 bubble plates, from which, at the 20th plate (calculated from the bottom end), a side stream of 4250 parts by weight of water and 34.5 parts by weight of acrylonitrile is drawn off for further working up. During the further working up of the bottom discharge of the acetonitrile column, 800 parts by weight of water and 4.6 parts by weight of acetonitrile are separated out by distillation and a vapour comprising 10.5 parts by weight of acrylonitrile and 1.4 parts by weight of acetonitrile is combined with a gas stream containing 1000 parts by weight of inert gas, 34.5 parts by weight of acrylonitrile and 4.6 parts by weight of acetonitrile to form a total stream of 1000 parts by weight of inert gas, 45 parts by weight of acrylonitrile and 6 parts by weight of acetonitrile, which is itself worked up.

*Example 2*

A steam-saturated gas stream containing 1000 parts by weight of inert gas (molecular weight 30), 45 parts by weight of inert gas, 34.5 parts by weight of acrylonitrile and 4.6 parts by weight of acetonitrile to and introduced, together with the condensate which forms in small quantity and which consists predominantly of 11 parts by weight of water, into the bottom end of a washing column ("acetonitrile column"), which contains 20 bubble plates.

255 parts by weight of water at a temperature of 25° C., containing 6.5 parts by weight of acrylonitrile, are supplied to the top of the column. 266 parts by weight of water, 6 parts by weight of acetonitrile and 10.5 parts by weight of acrylonitrile are run off from the base of the column. The gas leaving the column contains 1000 parts by weight of inert gas and 41 parts by weight of acrylonitrile and is supplied at the same pressure to another absorption column which contains 45 bubble plates over which trickles 1610 parts by weight of fresh water at a temperature of 25° C. A single-phase liquid mixture containing 1610 parts by weight of water and 41 parts by weight of acrylonitrile is discharged at the base of the column. 255 parts by weight of water and 6.5 parts by weight of acrylonitrile are taken from this mixture and returned to the top of the first column. The base discharge of the acetonitrile column is worked up in a manner similar to Example 1.

Both columns can be combined to form a column having a total of 65 bubble plates, and 1355 parts by weight of water and 34.5 parts by weight of acrylonitrile are drawn off from the 20th plate as a side stream and worked up to recover the acrylonitrile.

*Example 3*

A steam-saturated gas stream, containing 1000 parts by weight of inert gas (molecular weight 30), 45 parts by weight of acrylonitrile and 6 parts by weight of acetonitrile is conducted at atmospheric pressure and room temperature through an absorption column containing 20 bubble plates.

800 parts by weight of water at a temperature of 25° C. containing 60 parts by weight of acrylonitrile are supplied to the top of the column. 800 parts by weight of water, 6 parts by weight of acetonitrile and 11 parts by weight of acrylonitrile discharge at the bottom of the column, while the gas emerging from the top of the column consists of 1000 parts by weight of inert gas and 94 parts by weight of acrylonitrile.

This gas is compressed to 7 atm., cooled to 25° C. and introduced, together with the condensate formed, which contains 15 parts by weight of water as well as acrylonitrile, into the sump of a column containing 35 bubble plates and sprayed with 786.3 parts by weight of water. A two-phase mixture is discharged from the base of the column and this mixture is separated at 25° C. The upper phase contains 34 parts by weight of acrylonitrile and approximately 1.3 parts by weight of water, while the lower phase contains 800 parts by weight of water and 60 parts by weight of acrylonitrile. The upper phase is distilled while the lower phase is returned to the top of the acetonitrile column. The sump discharge of the acetonitrile column is worked up with partial return of acrylonitrile and acetonitrile in a manner analogous to Example 1.

*Example 4*

A steam-saturated gas stream, containing 1000 parts by weight of inert gas (molecular weight 30), 69 parts by weight of acrylonitrile and 10 parts by weight of acetonitrile is conducted at atmospheric pressure and 30° C. through a counter-current absorption column comprising 40 bubble plates. 1000 parts by weight of water at 30° C. and 16 parts by weight of acrylonitrile are supplied to the top of the column. 1000 parts by weight of water, 19 parts by weight of acrylonitrile and 10 parts by weight of acetonitrile are run off from the base of the column, while the gas leaving the top of the column contains 1000 parts by weight of inert gas and 66 parts by weight of a acrylonitrile. This gas is compressed to 7 atm. and cooled to 15° C., 25 parts by weight of water and 51 parts by weight of acrylonitrile condense to give two phases which are separated at 15° C. The upper layer contains 50 parts by weight of acrylonitrile and is distilled to give pure acrylonitrile. The gas leaving the cooler and containing 1000 parts by weight of inert gas and 15 parts by weight of acrylonitrile is now introduced into a second counter-current absorption column consisting of 40 bubble plates, which is operated at about 7 atm., and is sprayed with 983 parts by weight of water at a temperature of 15° C. A steam-saturated gas stream containing 1000 parts by weight of inert gas and only traces of organic constituents escapes at the top of the column. A liquid mixture consisting of 983 parts by weight of water and 15 parts by weight of acrylonitrile is discharged at the base of this column, and this mixture, after being combined with the aqueous layer from the separator to form a total stream of 1000 parts by weight of water and 16 parts by weight of acrylonitrile, is returned to the top of the first column which is operated at atmospheric pressure.

The sump discharge of the first absorption column is worked up so that 1000 parts by weight of water and 5 parts by weight of acetonitrile are separated out by distillation and are discharged from the process, while a vapour containing 19 parts by weight of acrylonitrile and 5 parts by weight of acetonitrile is combined with the gas stream coming from the acrylonitrile reactor and consisting of 1000 parts by weight of inert gas, 50 parts by weight of acrylonitrile and 5 parts by weight of acetonitrile to form a total stream of 1000 parts by weight of inert gas, 69 parts by weight of acrylonitrile and 10 parts by weight of acetonitrile, the working up of which has just been described.

What is claimed is:

1. Process for separating acrylonitrile and acetonitrile from a gas mixture containing both these components, which comprises scrubbing such gas mixture with a first water wash to absorb selectively thereby in said first water wash substantially all of said acetonitrile without absorbing substantially any of said acrylonitrile, and scrubbing the first washed residual gas mixture with a second water wash to absorb thereby in said second water wash substantially all of said acrylonitrile, recovering the absorbed acrylonitrile from one portion of said second water wash and using the remaining portion of said second water wash containing absorbed acrylonitrile therein as said first water wash for initially scrubbing said gas mixture containing both said components to achieve thereby the selective absorption of said acetonitrile therein.

2. Process according to claim 1 wherein the first washed residual gas prior to scrubbing with said second water wash is subjected to elevated pressure sufficient to liquify and thus remove part of the acrylonitrile contained therein as well as the water contained therein, and the residual gas mixture remaining after such liquification then scrubbed with said second water wash whereupon all of said second water wash containing acrylonitrile absorbed therein, including both said portions, are used as said first water wash.

3. Process according to claim 2 wherein the liquified water is recycled as additional water for said first water wash and said liquified acrylonitrile is recovered.

4. Process according to claim 3 wherein 20 to 90% of the acrylonitrile contained in said first washed residual gas mixture is liquified at the elevated pressure used.

5. Process according to claim 1 wherein the scrubbing with said first water wash is carried out at a different temperature from that at which the scrubbing with said second water wash is carried out.

6. Process according to claim 1 wherein the scrubbing with said first water wash is carried out at a different pressure from that at which the scrubbing with said second water wash is carried out.

7. Process according to claim 1 wherein the scrubbing with said first water wash is carried out at a different temperature and pressure from the temperature and pressure at which the scrubbing with said second water wash is carried out.

8. Process according to claim 1 wherein the scrubbing with said first water wash is carried out at the same total pressure as that at which the scrubbing with said second water wash is carried out while using a single column of water for both scrubbing steps, and a portion of such water in the column corresponding to said one portion of said second water wash is withdrawn for recovering the absorbed acrylonitrile therefrom, the lower section of the water column corresponding to said first water wash and the upper section of said column corresponding to said second water wash, the line of separation between said sections of said column being defined by the level at which said one portion of said second water wash is withdrawn from said column for recovering said absorbed acrylonitrile.

References Cited by the Examiner

UNITED STATES PATENTS

| | | | |
|---|---|---|---|
| 2,415,662 | 2/1947 | Teter et al. | 260—465.9 |
| 2,684,979 | 7/1954 | Wenner et al. | 260—465.9 |
| 2,773,088 | 12/1956 | Maslan | 260—465.1 |
| 3,133,957 | 5/1964 | Bellringer | 260—495.9 |
| 3,210,399 | 10/1965 | Krzemicki | 260—465.1 |

FOREIGN PATENTS

| | | |
|---|---|---|
| 228,188 | 7/1963 | Austria. |
| 478,772 | 11/1951 | Canada. |

REUBEN FRIEDMAN, *Primary Examiner.*

J. W. ADEE, *Assistant Examiner.*